United States Patent
Kawashima et al.

(10) Patent No.: US 12,085,956 B2
(45) Date of Patent: Sep. 10, 2024

(54) MOBILE UNIT SYSTEM

(71) Applicant: TOYOTA JIDOSHA KABUSHIKI KAISHA, Toyota (JP)

(72) Inventors: Mutsumi Kawashima, Nisshin (JP);
Tomoaki Miyazawa, Nagoya (JP);
Masato Noritake, Toyoake (JP);
Nobuhiro Nishikawa, Tokyo (JP);
Masato Kurima, Tokyo (JP); Tokuyuki Nishikawa, Toyota (JP); Reiko Tomita, Nagakute (JP); Takaaki Kato, Ichinomiya (JP); Hiroyuki Tomita, Aichi-ken (JP); Daisaku Kato, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 17/546,472

(22) Filed: Dec. 9, 2021

(65) Prior Publication Data
US 2022/0197303 A1 Jun. 23, 2022

(30) Foreign Application Priority Data
Dec. 17, 2020 (JP) ................................ 2020-209133

(51) Int. Cl.
*G05D 1/00* (2024.01)
(52) U.S. Cl.
CPC ......... *G05D 1/0287* (2013.01); *G05D 1/0276* (2013.01)

(58) Field of Classification Search
CPC .................................................. G05D 1/0287
See application file for complete search history.

(56) References Cited

U.S. PATENT DOCUMENTS

| | | | |
|---|---|---|---|
| 8,849,493 B2* | 9/2014 | Prada Gomez .... | B62D 15/0285 701/2 |
| 10,802,487 B2* | 10/2020 | Igata .................... | G05D 1/0088 |
| 2014/0018992 A1* | 1/2014 | Prada Gomez ...... | G05D 1/0234 701/23 |
| 2019/0009756 A1* | 1/2019 | Jacobs .................... | B60L 53/80 |
| 2019/0227551 A1* | 7/2019 | Igata ..................... | G06Q 20/20 |
| 2019/0227571 A1 | 7/2019 | Ito et al. | |
| 2022/0019213 A1* | 1/2022 | Haghighat Kashani ..................... | G05D 1/0231 |

FOREIGN PATENT DOCUMENTS

| | | |
|---|---|---|
| CN | 109564430 A | 4/2019 |
| CN | 110069062 A | 7/2019 |
| JP | 2006-123854 A | 5/2006 |
| JP | 2016-138853 A | 8/2016 |

* cited by examiner

*Primary Examiner* — Khoi H Tran
*Assistant Examiner* — Aaron G Cain
(74) *Attorney, Agent, or Firm* — Dinsmore & Shohl LLP

(57) ABSTRACT

A mobile unit system is lent to a user group consisting of at least one user in a park. The mobile unit system includes a first mobile unit configured to support an activity of the at least one user; and a second mobile unit configured to cooperate with the first mobile unit. The second mobile unit is smaller in size and has lower functionality than the first mobile unit. The first mobile unit has at least one of a baggage transportation function, a user transportation function, and a payment processing function.

7 Claims, 10 Drawing Sheets

MOBILE UNIT SYSTEM

CROSS REFERENCE TO RELATED APPLICATION

This application claims priority to Japanese Patent Application No. 2020-209133 filed on Dec. 17, 2020, which is incorporated herein by reference in its entirety including the specification, claims, drawings, and abstract.

TECHNICAL FIELD

The present specification discloses a mobile unit system that supports user activities in a predetermined area.

BACKGROUND

Parks such as amusement parks and theme parks are typically huge sites. Park visitors therefore sometimes get lost or very tired. As visitors to a park have to queue for attractions, restaurants, or restrooms when the park is crowded, freedom of user activities is sometimes limited. This causes a problem in that visitors are unable to enjoy the park fully.

To address this problem, it is possible to use a mobile unit for supporting user activities in a predetermined area of a huge site, such as a park. While many different forms of such mobile units are possible, it is possible to use a mobile unit as disclosed in, for example, JP 2006-123854 A. JP 2006-123854 A discloses a baggage carrying robot that moves autonomously while holding baggage, following a transmitter that the user is carrying. The use of such a mobile unit (baggage carrying robot) reduces burdens on the user, as it eliminates the necessity for the user to carry heavy baggage.

However, mobile units that have been heretofore proposed do not assume that one mobile unit cooperates with another mobile unit. Conventional techniques are therefore unable to address situations where support operations are needed simultaneously at two different places or where support operations are needed simultaneously for respective ones of two or more users who are located at positions that are different from each other. As a result, conventional techniques are unable to sufficiently reduce burdens on users in a predetermined area.

In consideration of the above, the present specification discloses a mobile unit system that further reduces burdens on users in a predetermined area and that allows the users to further enjoy the predetermined area.

SUMMARY

The present specification discloses a mobile unit system that is to be lent to a user group consisting of at least one user in a predetermined area. The mobile unit system includes a first mobile unit configured to support an activity of the at least one user; and a second mobile unit configured to cooperate with the first mobile unit. The second mobile unit is smaller in size and has lower functionality than the first mobile unit.

As the mobile unit system includes a first mobile unit and a second mobile unit that cooperates with the first mobile unit, this configuration makes it possible to provide support operations simultaneously at two different places, and to reduce burdens on the users in the predetermined area. As the second mobile unit is smaller in size and has lower functionality than the first mobile unit, the number of costly first mobile units that are required in the predetermined area overall can be reduced, and the costs can be reduced. As the second mobile unit is smaller in size and has lower functionality than the first mobile unit, this configuration can give the users an impression as if the second mobile unit is a "child" of the first mobile unit and can increase emotional attachments that the users develop towards the mobile units.

In the above-described configuration, the first mobile unit may have at least one of a baggage transportation function, a user transportation function, and a payment processing function, and the second mobile unit may have none of a baggage transportation function, a user transportation function, and a payment processing function.

As the first mobile unit has at least one of a baggage transportation function, a user transportation function, and a payment processing function, this configuration can reduce burdens on the users in the predetermined area.

The mobile unit system may be operable in split mode when lent to a user group including a first user and a second user. During split mode, the first mobile unit may move together with the first user, the second mobile unit may move together with the second user, and, in response to a rejoin instruction from either the first user or the second user, at least one of the first mobile unit and the second mobile unit may move toward the other to help the first user and the second user rejoin each other.

This configuration enables the first and second mobile units to follow respective ones of the first and second users who are doing things away from each other, and therefore enables support of respective ones of the first and second users who are doing things away from each other. As the first and second mobile units that are operating away from each other keep track of each other's positions, this configuration enables easy rejoining when needed, even if the first and second users temporarily move away from each other.

In the above-described configuration, during split mode, the second mobile unit may guide a moving range of the second user to prevent the distance to the first mobile unit from exceeding a predefined split distance.

This configuration makes it possible to prevent the first and second users from moving too far away from each other and allows the first and second users to easily rejoin each other.

The mobile unit system may also be operable in agent mode. During agent mode, the first mobile unit may execute a substitution process designated by the at least one user on behalf of the at least one user, the second mobile unit may move together with the at least one user, and, after the substitution process proceeds to a defined rejoinable state, at least one of the first mobile unit and the second mobile unit may move toward the other to help the at least one user rejoin the first mobile unit.

As the high-functionality first mobile unit executes a process for the users as an agent, this configuration enables reduction of burdens on the users and allows the users to further enjoy the predetermined area. As the second mobile unit moves together with the users, this configuration allows the users to easily rejoin the first mobile unit as needed.

In the above-described configuration, during agent mode, the second mobile unit may guide a moving range of the at least one user to prevent the distance to the first mobile unit from exceeding a predefined agent distance.

This configuration makes it possible to prevent the first mobile unit and the users from moving too far away from each other and allows the first mobile unit and the users to easily rejoin each other.

The second mobile unit may be a flying unit that is capable of flight, the flying unit having a camera that enables capture of an image of the at least one user from above.

As the second mobile unit is smaller than the first mobile unit, the second mobile unit can be easily implemented in the form of a flying unit. Using a flying unit as the second mobile unit to capture an image of the users from above makes it possible to obtain an image that is more useful to the users.

When the user group is a small user group whose number of members is less than a defined minimum number, only the second mobile unit of the mobile unit system may be lent to the small user group, and the second mobile unit may be operated in solo mode. During solo mode, the second mobile unit may move together with the at least one user and, in response to a merge instruction from the at least one user indicating that the small user group is to be merged with another small user group, may establish a temporary team with a second mobile unit that is lent to the other small user group. When the number of second mobile units that constitute the temporary team becomes greater than or equal to a defined lend criterion number, permission may be given to lend the first mobile unit to a user group that is created after the small user groups are merged.

This configuration motivates a user who visits the predetermined area alone, or a small group of users who visit the predetermined area with one or a few others, to attempt to actively interact with other visitors who are alone or in small groups. As a result, interactions between users are prone to happen, enabling the users to have more interesting and enjoyable experiences.

The mobile unit system disclosed in the present specification enables further reduction in burdens on users in a predetermined area and therefore allows the users to further enjoy the predetermined area.

BRIEF DESCRIPTION OF DRAWINGS

Embodiments of the present disclosure will be described based on the following figures, wherein.

DESCRIPTION OF EMBODIMENTS

Figure 1:
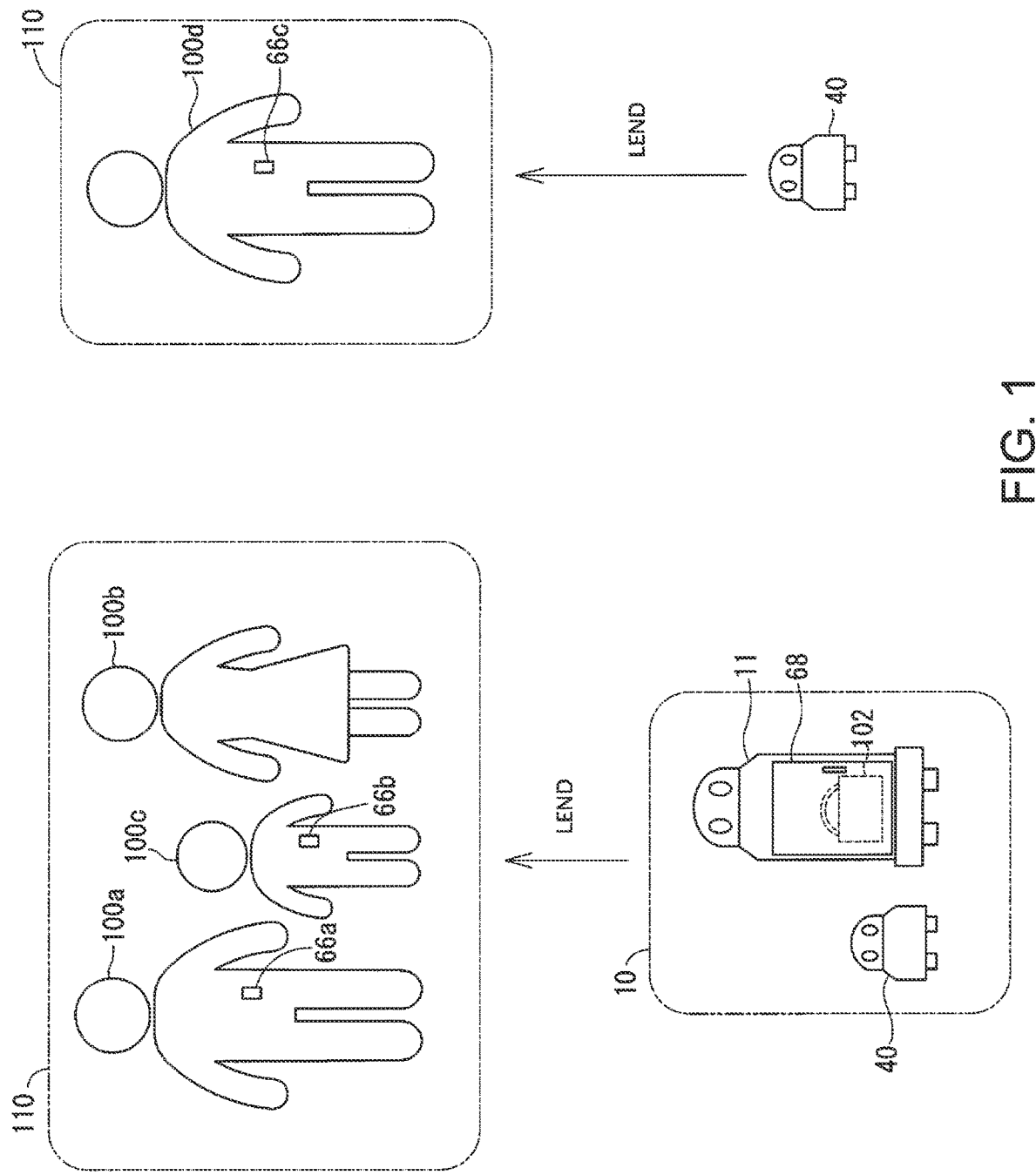
FIG. 1 is a conceptual diagram illustrating a manner in which a mobile unit system is used.
Figure 2:
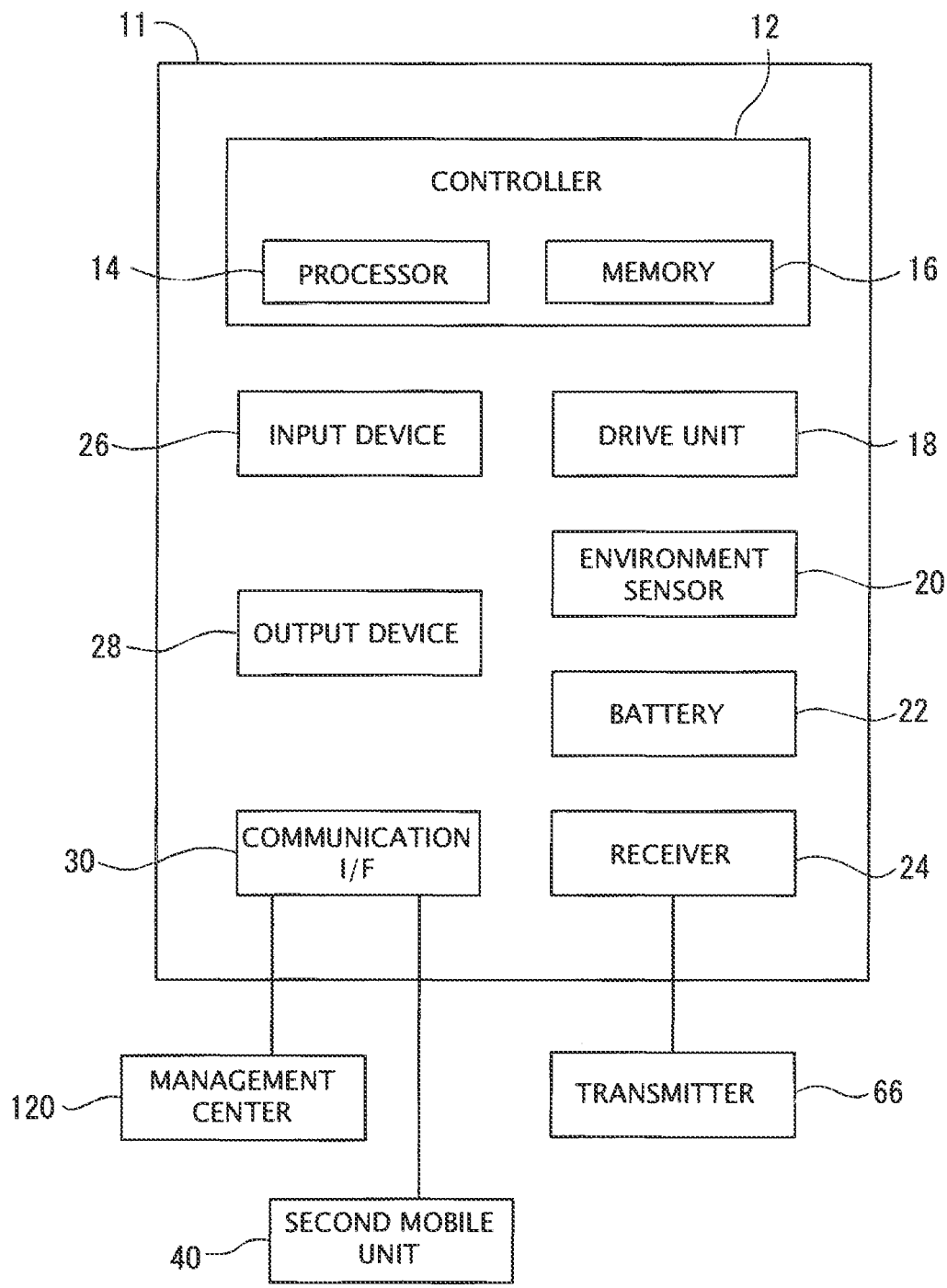
FIG. 2 is a block diagram illustrating a structure of a first mobile unit.
Figure 3:
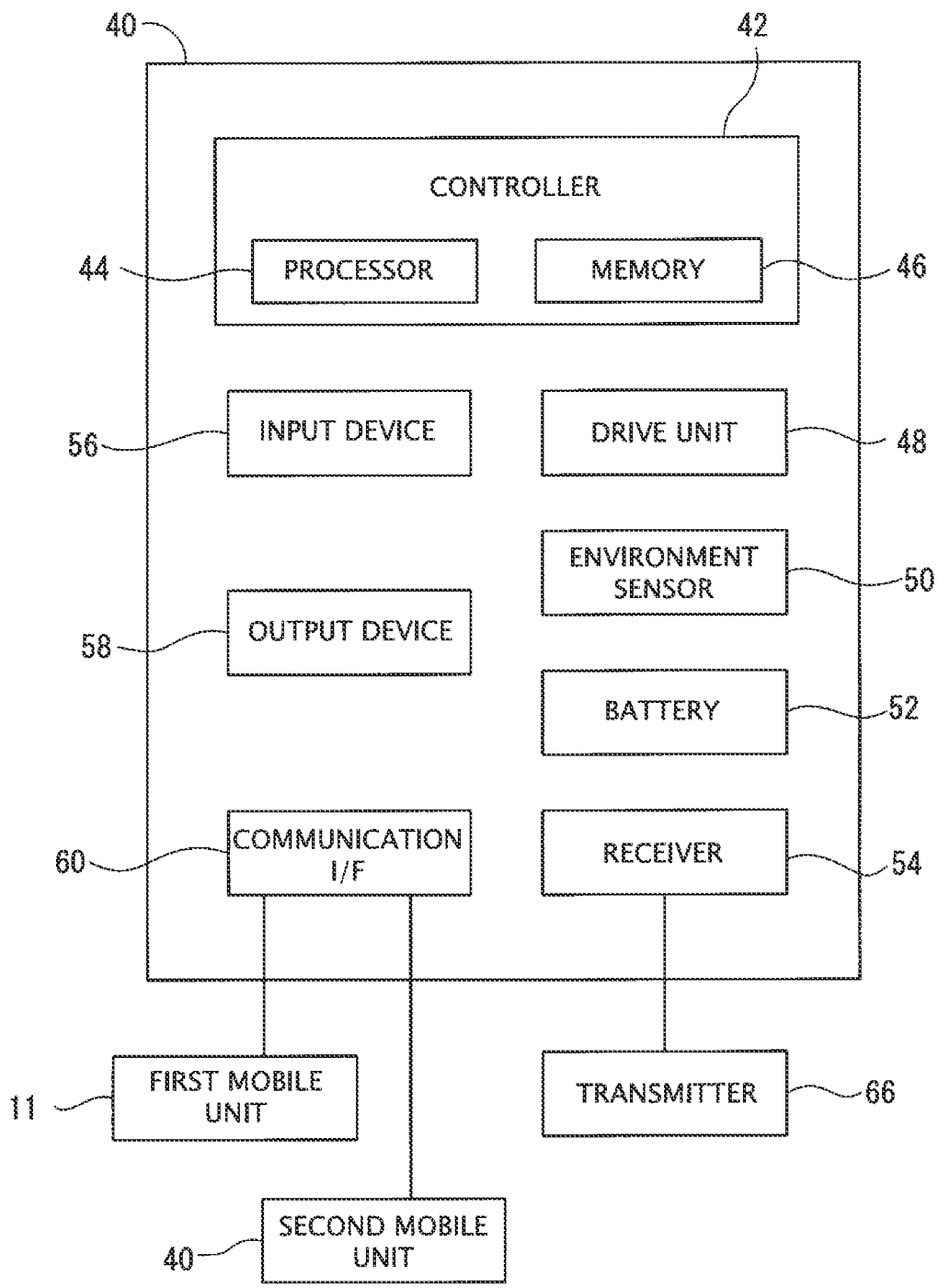
FIG. 3 is a block diagram illustrating a structure of a second mobile unit.

A structure of a mobile unit system will be described below with reference to the drawings. FIG. 1 is a conceptual diagram illustrating a manner in which a mobile unit system is used. FIG. 2 is a block diagram illustrating a structure of a first mobile unit 11, and FIG. 3 is a block diagram illustrating a structure of a second mobile unit 40. While reference numerals "100" and "66" in the drawings have alphabetical suffixes, they are simply expressed as "100" and "66" in the following description, without alphabetical suffixes where the distinction is not necessary.

The mobile unit system is configured to support an activity of a user 100 in a park (such as an amusement park or a theme park) which serves as a predetermined area. The mobile unit system includes a first mobile unit 11 and one or more second mobile units 40.

The mobile units 11 and 40 are lent to a user group 110. The user group 110 is a group consisting of one or more users 100 who do activities together. As such, when families or friends visit the park, a family or a group of friends constitute one user group 110. When someone visits the park alone, this single user 100 constitutes one user group 110.

Mobile units 11 and 40 are lent to user groups 110. The combination of mobile units 11 and 40 that are lent to each user group 110 varies depending on the number of users 100 included in the user group 110. When the number of members in a user group 110 is greater than or equal to a defined minimum number Ng, a mobile unit group 10 consisting of a first mobile unit 11 and one or more second mobile units 40 that cooperate with the first mobile unit 11 is lent to the user group 110. On the other hand, when the number of members in a user group 110 is less than the minimum number Ng, no first mobile unit 11 is lent, and only a single second mobile unit 40 is lent to the user group 110. The minimum number Ng is not particularly limited and may be any number that satisfies $Ng \geq 2$. The following description assumes that $Ng=2$. Therefore, when the number of members in the user group 110 is one, the second mobile unit 40 is lent solo. Otherwise, the mobile unit group 10 is lent to the user group 110. In the following description, the user group 110 having a number of members that is less than the minimum number Ng is referred to as "small user group 110". A state in which the mobile unit group 10 is lent is referred to as "group lend state", and a state in which only a single second mobile unit 40 is lent is referred to as "solo lend state".

In the group lend state, the mobile units 11 and 40 are operable in one of standard mode, split mode, and agent mode, which will be described below. In the solo lend state, the second mobile unit 40 is operable in solo mode, which will be described below. The second mobile unit 40 operating in the solo lend state may create a temporary team with another second mobile unit 40 operating in the solo lend state. When the number of second mobile units 40 that constitute the temporary team becomes greater than or equal to a defined lend criterion number N1, the first mobile unit 11 may be additionally lent, enabling transition to the group lend state, which will be described below.

The respective structures of the first mobile unit 11 and the second mobile unit 40 will next be described below. The first mobile unit 11 is capable of autonomously moving in accordance with an instruction from the user 100. The first mobile unit 11 has a comparatively larger size and higher functionality than the second mobile unit 40, which will be described below. The first mobile unit 11 is capable of executing various processes for supporting activities of the user 100. Unlike the second mobile unit 40, the first mobile unit 11 is capable of, in particular, executing at least one of baggage transportation, user transportation, and payment processing for supporting activities of the user 100. In the example of FIG. 1, the first mobile unit 11 can accommodate therein baggage 102 of the user 100, and is capable of transporting the baggage 102. The first mobile unit 11 has on its surface a lid 68 that is openable and closable, and when the lid 68 is opened, the baggage 102 can be loaded or unloaded.

In addition to the transportation of the baggage 102, the first mobile unit 11 performs a process (for example, shopping) that is designated by the user 100 on behalf of the user 100 or manages activities of the second mobile unit 40, as will be described below. The size and design of the first mobile unit 11 are not particularly limited. In the illustrated example, the first mobile unit 11 includes a dome-shaped head and therebelow a cylindrical body, the head having a design that is suggestive of "eyes". As this design of "eyes" can give the user 100 an impression that the first mobile unit 11 is a living thing with emotions, the user 100 tends to become emotionally attached to the first mobile unit 11.

The second mobile unit 40 is capable of autonomously moving in cooperation with the first mobile unit 11. The term "cooperation" as used herein refers to obtaining information or an instruction through communication with a cooperation partner to determine at least some of own activities in accordance with the obtained information or instruction. The second mobile unit 40 is smaller than the first mobile unit 11, and the functionality is limited. As such, the second mobile unit 40 is unable to execute any of baggage transportation, user transportation, and payment processing.

The second mobile unit 40 may have any structure that is smaller than the first mobile unit 11, and the size and design are not particularly limited. However, the second mobile unit 40 may have design features that are similar to design features of the first mobile unit 11 so that the association with the first mobile unit 11 is easily perceived. In the illustrated example, the second mobile unit 40 includes a dome-shaped head that is similar to that of the first mobile unit 11 and a cylindrical body that is shorter than the body of the first mobile unit 11. The head of the second mobile unit 40 also has a design of "eyes" similar to the "eyes" of the first mobile unit 11. Configuring the second mobile unit 40 in this manner to be smaller than the first mobile unit 11 and to have design features similar to those of the first mobile unit 11 can give the user 100 an impression that the second mobile unit 40 is a "child" of the first mobile unit 11. Creating an impression as if it is a "child" can then further strengthen the impression that the first mobile unit 11 and the second mobile unit 40 are living things and can increase emotional attachments that the user 100 develops towards the first mobile unit 11 and the second mobile unit 40. Humans often get emotionally attached to living things of young ages, such as puppies, kittens, or baby chickens. Therefore, creating an impression that the second mobile unit 40 is a "child" of the first mobile unit 11 and as if it is an individual of a young age can further increase emotional attachments that the user 100 develops towards the second mobile unit 40.

Specific structures of the first mobile unit 11 and the second mobile unit 40 will next be described below with reference to FIGS. 2 and 3. The first mobile unit 11, which is capable of autonomously moving, includes a drive unit 18, an environment sensor 20, and a battery 22. The drive unit 18 is configured to cause the first mobile unit 11 to move, and includes a traveling unit including wheels or crawler tracks and a motor for supplying power to the traveling unit. The environment sensor 20 is configured to detect surrounding conditions around the first mobile unit 11, and includes, for example, a position detection sensor (such as a GPS sensor), a nearby object detection sensor (such as a lidar, millimeter-wave radar, sonar, or a magnetic sensor), and a camera for capturing an image of the surrounding. A controller 12, which will be described below, controls driving of the drive unit 18 based on information obtained from the environment sensor 20.

The battery 22 stores power that is to be supplied to electrical components such as the motor and the controller 12 that are provided in the first mobile unit 11. The battery 22 is a rechargeable/dischargeable secondary battery such as a lithium-ion battery. The battery 22 may be irremovably secured to the first mobile unit 11 or may be removable from the first mobile unit 11 as desired.

An input device 26 is configured to receive an input of an instruction from the user 100 and includes at least one of a switch, a keyboard, a touch panel, and a microphone. An output device 28 is configured to present information to the user 100 and includes at least one of, for example, a lamp, a display, and a speaker. Although, in this example, the input device 26 and the output device 28 are provided in the first mobile unit 11, these devices may be provided outside the first mobile unit 11. For example, an information terminal (such as a smartphone) that the user 100 is carrying may be used as the input device 26 and the output device 28 of the first mobile unit 11. More specifically, when the mobile unit system is lent to the user 100, an information terminal that the user 100 is carrying may be registered with the first mobile unit 11, enabling data exchange between the first mobile unit 11 and the information terminal using a wireless communication standard such as Bluetooth (registered trademark). This information terminal may be used to input an instruction to the first mobile unit 11, and information output from the first mobile unit 11 may be displayed on the information terminal. In any configuration, the first mobile unit 11 is capable of receiving an instruction from the user 100 and presenting information to the user 100.

A communication I/F 30 is configured to perform wireless communication with an external information device that is outside the first mobile unit 11. In the present example, in particular, the communication I/F 30 is capable of communication with a management center 120 and the second mobile unit 40. The management center 120 is configured to manage a plurality of mobile unit systems, and, for example, manages the lending of mobile unit systems or processes payment information sent from the first mobile unit 11. The communication I/F 30 may support a plurality of types of communication standards to enable such communication with the management center 120 and the second mobile unit 40. For example, the communication I/F 30 may be capable of Internet communication using Wi-Fi (registered trademark) or mobile data communication. The communication I/F 30 may also support a near-field wireless communication standard such as Bluetooth (registered trademark).

A receiver 24 is configured to receive a signal from a transmitter 66 that the user 100 is carrying. The transmitter 66 is lent to the user 100 together with the mobile unit system, and during the use of the mobile unit system, the user 100 wears the transmitter 66. The transmitter 66 is configured to periodically output a radio signal or an ultrasonic signal for user tracking, and is, for example, a Bluetooth beacon transmitter. The receiver 24 receives a signal from the transmitter 66. The controller 12 determines the position of the user based on the signal received by the receiver 24. The first mobile unit 11 moves together with the user 100 as needed.

A plurality of transmitters 66 may be lent to one user group 110. For example, the number of transmitters 66 lent to one user group 110 may be the same as the number of mobile units 11 and 40 that constitute the mobile unit group 10 that is lent to this user group. For example, in the example on the left in FIG. 1, as the mobile unit group 10 includes two mobile units 11 and 40, two transmitters 66 may be lent to one user group 110. Such a configuration enables a plurality of mobile units 11 and 40 to track respective transmitters 66 that are different from each other.

The controller 12 controls driving of components that constitute the first mobile unit 11. The controller 12 is a computer that includes a processor 14 and a memory 16. The "computer" herein also encompasses a microcontroller in which a computer system is embedded in one integrated circuit. The processor 14 broadly represents a processor, including a general-purpose processor, such as a central processing unit (CPU), and a special-purpose processor, such as a graphics processing unit (GPU), an application specific integrated circuit (ASIC), a field-programmable gate array (FPGA), and a programmable logic device (PLD). The operation of the processor 14, which will be described below, may be implemented not only by a single processor but also by a plurality of collaborating processors that are disposed at physically distant locations. Similarly, the memory 16 also need not be a physically unitary element and may be composed of a plurality of memories that are disposed at physically distant locations. The memory 16 may include at least one of a semiconductor memory (such as a RAM, a ROM, or a solid-state drive) and a magnetic disk (such as a hard disk drive).

The second mobile unit 40 has a structure similar to that of the first mobile unit 11. Specifically, as illustrated in FIG. 3, the second mobile unit 40 includes a controller 42, a drive unit 48, an environment sensor 50, a battery 52, a receiver 54, an input device 56, an output device 58, and a communication I/F 60. The controller 42 is a computer that includes a processor 44 and a memory 46. However, the second mobile unit 40 overall may have lower functionality than the first mobile unit 11. As such, for example, the controller 42 of the second mobile unit 40 may have lower processing power than the controller 12 of the first mobile unit 11. The drive unit 48 of the second mobile unit 40 may have poorer traveling capability than the drive unit 18 of the first mobile unit 11. As such, for example, the maximum speed and the maximum torque of the second mobile unit 40 may be lower than those of the first mobile unit 11. The communication I/F 60 of the second mobile unit 40 may be capable of communication with only the first mobile unit 11 and one or more other second mobile units 40, and may be incapable of communication with the management center 120. As such, the communication I/F 60 of the second mobile unit 40 may support a public communication network such as a Wi-Fi network or a mobile data communication network, or may support a private communication network that only enables communication with one or more particular mobile units. In any configuration, the second mobile unit 40 periodically performs wireless communication with the first mobile unit 11 and, in response to an instruction from the first mobile unit 11, can act in cooperation with the first mobile unit 11. As the second mobile unit 40 overall is small in size and has low functionality, the battery 52 mounted on the second mobile unit 40 may be smaller in size and lower in capacity than the battery 22 mounted on the first mobile unit 11.

Operation modes of the above-described mobile unit system will next be described below. The mobile unit system according to the present example has a plurality of operation modes and allows the user 100 or the management center 120 to select a desired operation mode. Specifically, in the group lend state in which the mobile unit group 10 is lent to one user group 110, standard mode, agent mode, and split mode are selectable. On the other hand, in the solo lend state in which the first mobile unit 11 is not lent and only the second mobile unit 40 is lent to one user group 110, only solo mode is selectable.

Standard mode is the most standard form of operation, in which both the first mobile unit 11 and the second mobile unit 40 move together with the user 100. During periods of time in which the operation is in standard mode, the user 100 can instruct the first mobile unit 11 as desired to execute various types of processes through operation of the input device 26 that is provided on the first mobile unit 11. Examples of the processes that can be executed by the first mobile unit 11 include, in addition to the above-described transportation of baggage of the user 100, payment processing, route guidance to the destination, information presentation, and other processes.

During standard mode, the first mobile unit 11 moves together with the user 100, or more accurately, together with a first transmitter 66a that one of users 100 is carrying. More specifically, during standard mode, the first mobile unit 11 determines the position of the first transmitter 66a based on a signal received by the receiver 24. The first mobile unit 11 then controls its movement direction and speed so that the distance from the first transmitter 66a is always within a predefined companion distance. The companion distance is a distance that is allowed when a mobile unit moves together with the user 100 and is, for example, a few meters. The companion distance may be a predefined fixed value or may be a variable value that can be changed as desired. The companion distance value may be freely settable by the user 100 or may be changed automatically in accordance with a process that is being executed by a mobile unit 11 or 40. When route guidance is being executed, the first mobile unit 11 moves toward the destination that is input from the user 100, while keeping the companion distance.

The first mobile unit 11 is also capable of executing payment processing as needed. Forms of payment are not particularly limited and may be by cash, magnetic or RFID prepaid card, credit card, or barcode. To support these payment methods, the first mobile unit 11 may incorporate, for example, a cashier device configured to count an amount of received cash and give change as needed, a card reader, an RFID reader, and a barcode reader. Through this payment processing function, the user 100 can purchase various goods (for example, souvenirs or meals) and can also purchase park attraction tickets. Tickets that are purchased via the first mobile unit 11 may be electronic tickets that are managed and stored by the first mobile unit 11. In this configuration, at an attraction entrance gate, communication may be performed with the first mobile unit 11 that moves together with the user 100 to automatically determine whether or not tickets have been purchased. This configuration makes it easier for the user 100 to handle tickets as it eliminates worries that the purchased tickets may be lost, and removes the hassle of taking out the tickets at the entrance gate.

The first mobile unit 11 may present information to the user 100 as appropriate. Information that is presented may be information that is presented at the request of the user 100. For example, the user 100 may operate the input device 26 of the first mobile unit 11 to request information concerning attractions or restaurants in the park or the weather, and in accordance with this request, the first mobile unit 11 may present the requested information to the user 100 via the output device 28. In another embodiment, the first mobile unit 11 may present predetermined information regardless of whether or not the user 100 requests it. For example, the first mobile unit 11 may present park campaign or event information to the user 100 regardless of whether or not the user 100 requests it.

During standard mode, the second mobile unit 40 moves together with the first mobile unit 11 and supports the first mobile unit 11 as needed. More specifically, the second mobile unit 40 communicates with the first mobile unit 11 to determine the position of the first mobile unit 11 and adjusts the movement direction and speed so that the distance from the first mobile unit 11 falls within a defined following distance. The following distance is a distance from the first mobile unit 11 to the second mobile unit 40, which is allowed during standard mode, and is, for example, a few meters.

The second mobile unit 40 may support the first mobile unit 11 in accordance with an instruction from the first mobile unit 11. For example, in accordance with an instruction from the first mobile unit 11, the second mobile unit 40 may follow one or more users 100c (for example, a "child" user) and may output an alarm when this user 100c moves away from another user 100a (for example, a "parent" user). More specifically, as illustrated on the left in FIG. 1, when the user group 110 includes a parent 100a and a child 100c, as preparations, the parent 100a carries the first transmitter 66a and the child 100c carries a second transmitter 66b. The first mobile unit 11 moves together with the first transmitter 66a and the second mobile unit 40 moves together with the second transmitter 66b. When, as the second mobile unit 40 follows the second transmitter 66b, the distance between the first mobile unit 11 and the second mobile unit 40 exceeds the following distance, the second mobile unit 40 outputs an alarm to alert that the child 100c has moved away from the parent 100a. This configuration makes it possible to effectively prevent one or more of the users 100 from getting lost.

Figure 4:
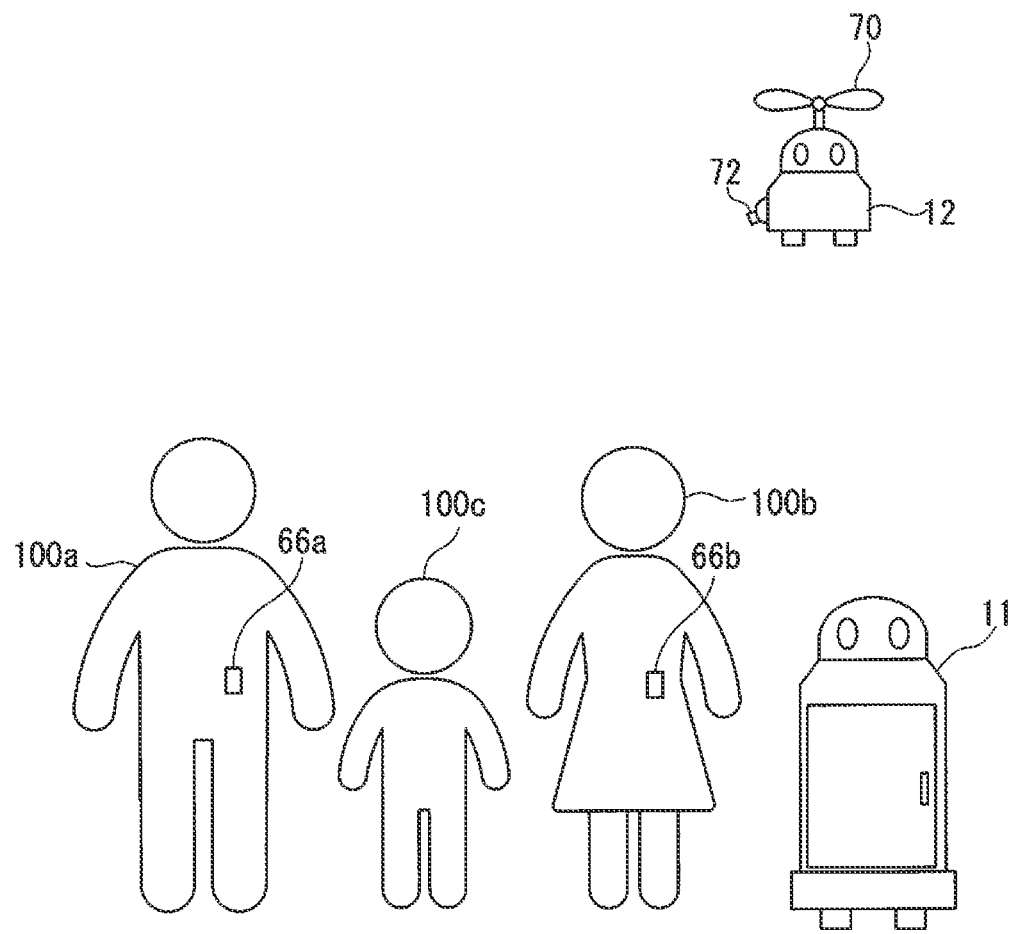
FIG. 4 is a conceptual diagram illustrating a manner in which a flying unit serves as the second mobile unit.

The second mobile unit 40 is smaller in size and lighter in weight than the first mobile unit 11. The second mobile unit 40 may take advantage of these characteristics to perform a process that cannot be performed by the first mobile unit 11. For example, the first mobile unit 11 is unable to enter a narrow space. Therefore, in accordance with an instruction from the first mobile unit 11, the second mobile unit 40 may perform a process to enter a narrow space. As illustrated in FIG. 4, the second mobile unit 40 may have a flight mechanism such as a propeller 70, making the second mobile unit 40 a flying unit that is capable of flight. In this configuration, the second mobile unit 40 may further have a camera 72, which enables capturing of an image of the user 100 from above in accordance with an instruction from the first mobile unit 11. In any configuration, during standard mode, the second mobile unit 40 moves together with the first mobile unit 11 and supports the first mobile unit 11 as needed, which makes it possible to more appropriately support activities of the user 100.

Figure 5:
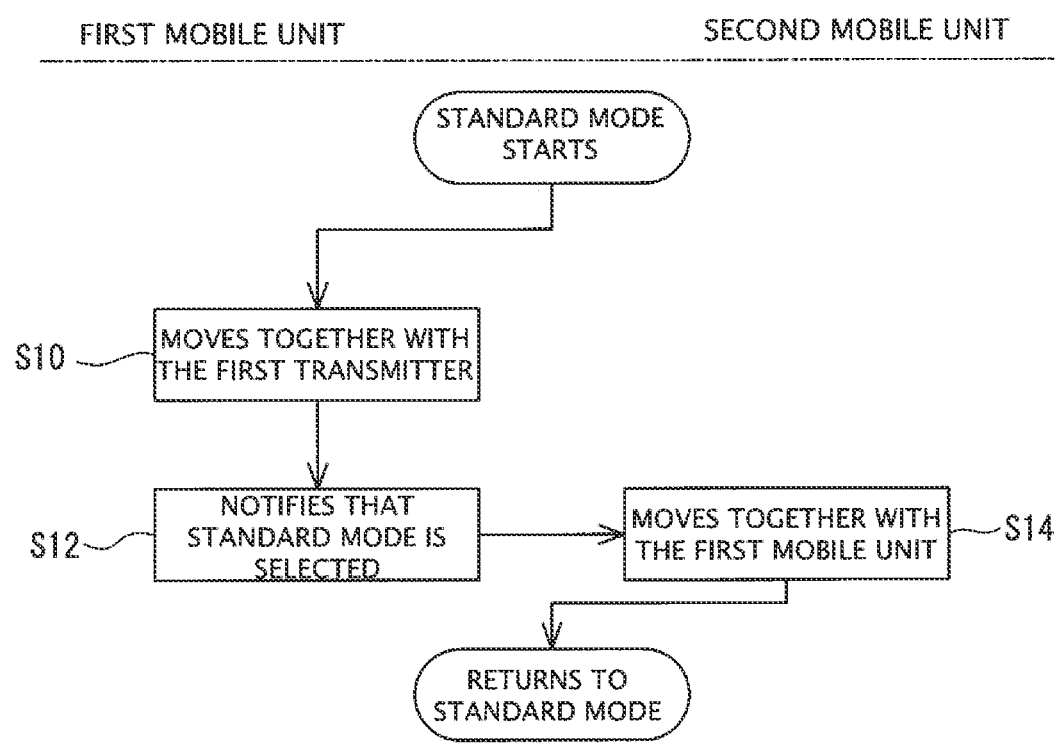
FIG. 5 is a flowchart illustrating a process flow in standard mode.

FIG. 5 is a flowchart illustrating a process flow in standard mode. When the user 100 or the management center 120 provides an instruction to perform operation in standard mode, the first mobile unit 11 moves together with the first transmitter 66a so that the distance from the first transmitter 66a falls within the companion distance (S10). The first mobile unit 11 notifies the second mobile unit 40, via communication, that standard mode is selected (S12). In response to this notice, the second mobile unit 40 moves together with the first mobile unit 11 so that the distance from the first mobile unit 11 falls within the defined following distance (S14). After that, similar processes are repeated as long as standard mode continues. In parallel with the process of FIG. 5, the first mobile unit 11 also performs another process such as route guidance processing, payment processing, or information presentation processing in accordance with an instruction from the user 100. In parallel with the process of FIG. 5, the second mobile unit 40 performs a process to support the first mobile unit 11 in accordance with an instruction from the first mobile unit 11.

Figure 6:
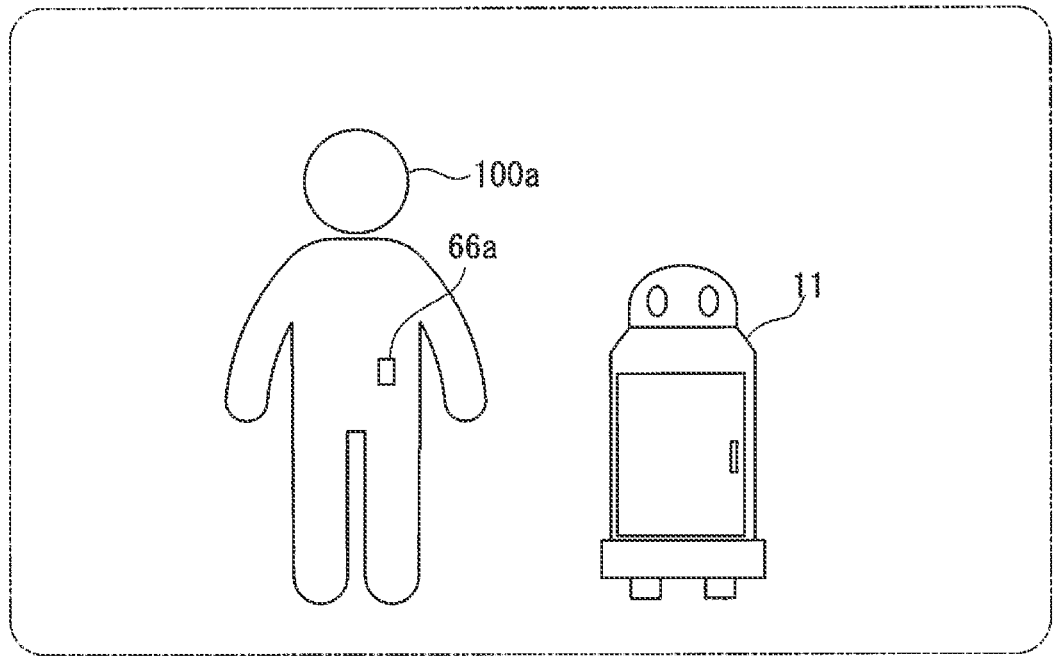
FIG. 6 is a conceptual diagram illustrating a manner in which split mode runs.
Figure 6:
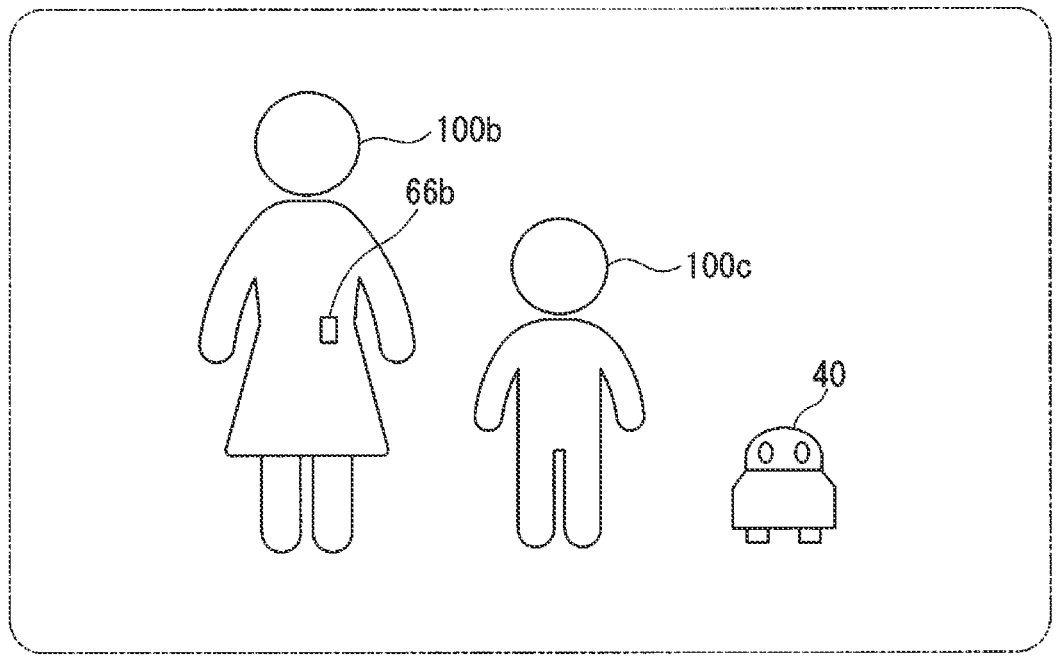

Split mode will next be described below. FIG. 6 is a conceptual diagram illustrating a manner in which split mode runs. In split mode, the first mobile unit 11 moves together with a first user 100a, and the second mobile unit 40 moves together with a second user 100b who is acting away from the first user 100a. Specifically, during split mode, the first mobile unit 11 moves tracking a signal from the first transmitter 66a that the first user 100a is carrying. The second mobile unit 40 moves tracking a signal from the second transmitter 66b that the second user 100b is carrying.

During split mode, the first mobile unit 11 performs various types of processes including payment processing, route guidance processing, information presentation processing, and other processes, as in standard mode. During split mode, the first mobile unit 11 periodically confirms the distance from the second mobile unit 40 and causes the second mobile unit 40 to output an alarm when the distance from the second mobile unit 40 exceeds a defined split distance. The split distance is a separation distance that is allowed during split mode. The split distance is significantly larger than the companion distance or the following distance described above and is, for example, tens of meters to a few kilometers. The split distance value may be freely settable by the user 100 or may be a predefined fixed value.

When the first user 100a provides an instruction to rejoin, the first mobile unit 11 instructs the second mobile unit 40 to rejoin. In response to this rejoin instruction, the second mobile unit 40 presents information indicating the receipt of this instruction to the second user 100b and moves to the position of the first mobile unit 11 to guide the second user 100b to the first mobile unit 11.

Figure 7:
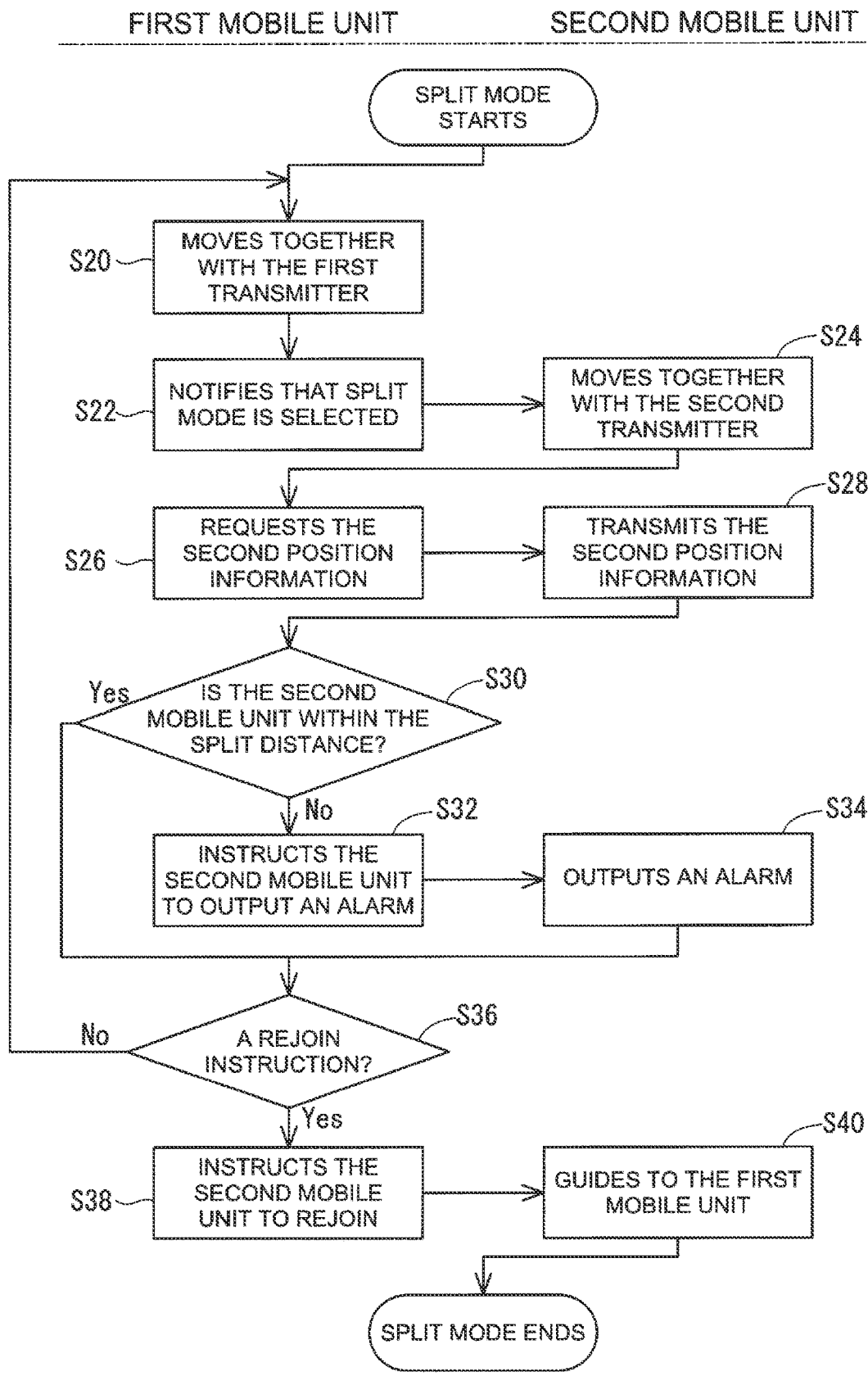
FIG. 7 is a flowchart illustrating a process flow in split mode.

FIG. 7 is a flowchart illustrating a process flow in split mode. When the user 100 provides an instruction to perform operation in split mode, the first mobile unit 11 moves together with the first transmitter 66a so that the distance from the first transmitter 66a falls within the companion distance (S20). The first mobile unit 11 notifies the second mobile unit 40, via communication, that split mode is selected (S22). In response to this notice, the second mobile unit 40 moves together with the second transmitter 66b so that the distance from the second transmitter 66b falls within the companion distance (S24).

Subsequently, via wireless communication, the first mobile unit 11 requests the second mobile unit 40 to transmit the position information of the second mobile unit 40 (hereinafter referred to as "second position information") (S26). In response to this request, the second mobile unit 40 transmits its own position information obtained by, for example, the GPS receiver to the first mobile unit 11 via wireless communication (S28). The first mobile unit 11 compares its own position with the second position information to confirm whether or not the second mobile unit 40 is located within the defined split distance (S30). As a result of the confirmation, when the second mobile unit 40 is away beyond the split distance (No in S30), the first mobile unit 11 instructs the second mobile unit 40 to output an alarm (S32). In response to this instruction, the second mobile unit 40 outputs an alarm to the second user 100b to guide the second user 100b to move closer to the first mobile unit 11 (S34). In other words, the second mobile unit 40 guides a moving range of the second user 100*b* to prevent the distance to the first mobile unit 11 from exceeding the split distance.

On the other hand, when the distance between the first mobile unit 11 and the second mobile unit 40 is within the split distance (Yes in S30), the first mobile unit 11 confirms whether or not a rejoin instruction is input (S36). As a result of the confirmation, when no rejoin instruction is input from the first user 100*a* (No in S36), the processes of steps S20 through S34 are repeated. On the other hand, when a rejoin instruction is input from the first user 100*a* (Yes in S36), the first mobile unit 11 instructs the second mobile unit 40 to rejoin (S38). In response to this instruction, the second mobile unit 40 presents information indicating the receipt of a rejoin instruction to the second user 100*b* and moves toward the first mobile unit 11 to guide the second user 100*b* to the first user 100*a* (S40).

Configuring the mobile units 11 and 40 in this manner to follow respective ones of two or more users 100 who are acting away from each other makes it possible to support respective ones of the two or more users 100 who are doing things away from each other. Configuring two or more mobile units 11 and 40 that are operating away from each other to keep track of each other's positions enables easy rejoining when needed, even if the two or more users 100 temporarily move away from each other. Although, in the foregoing description, a rejoin instruction input from the user 100 is received only by the first mobile unit 11, such a rejoin instruction input may also be received by the second mobile unit 40. Although, in the foregoing description, in response to a rejoin instruction, the second mobile unit 40 moves toward the first mobile unit 11, the first mobile unit 11 may, conversely, move toward the second mobile unit 40.

Figure 8:
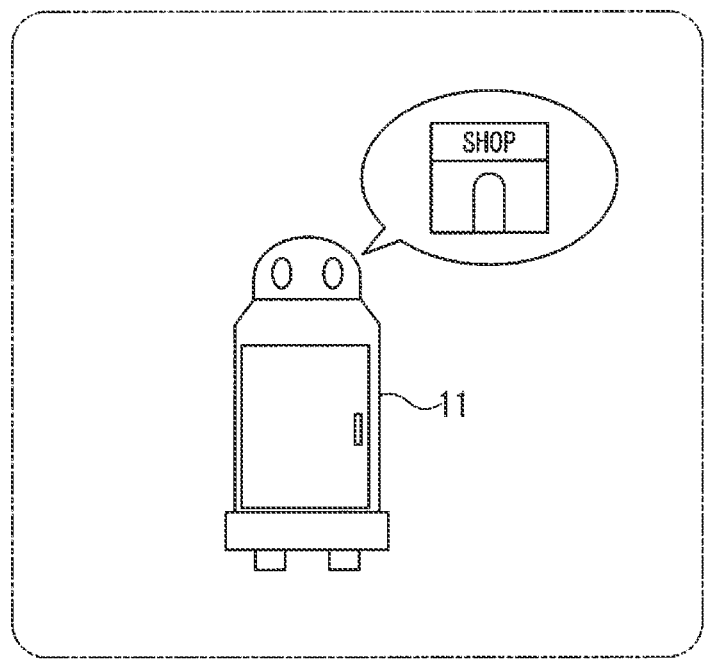
FIG. 8 is a conceptual diagram illustrating a manner in which agent mode runs.
Figure 8:
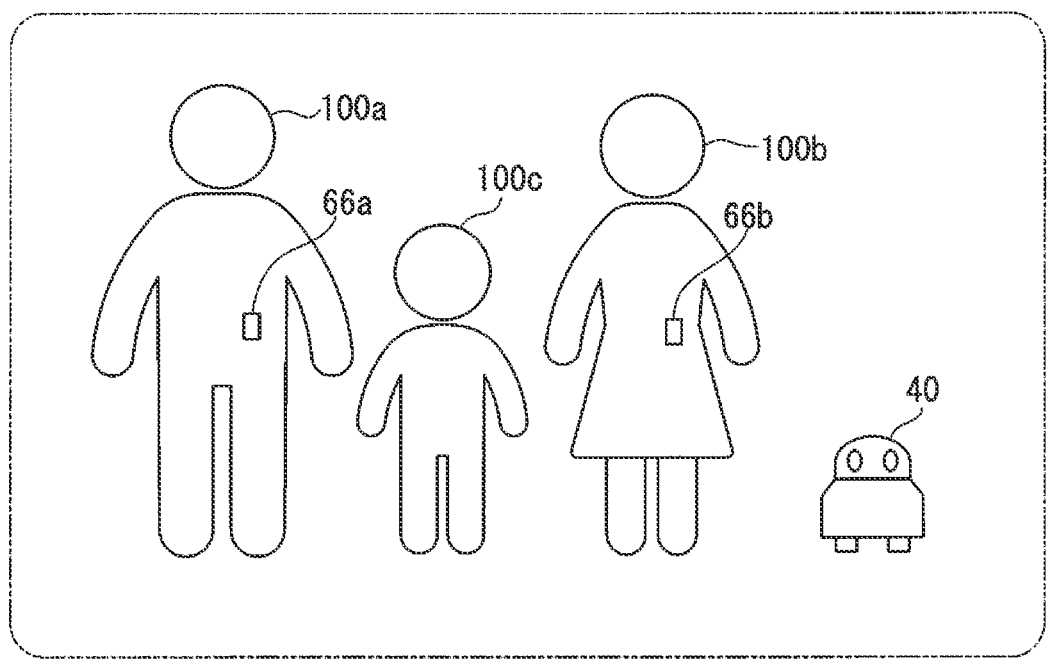

Agent mode will next be described below. FIG. 8 is a conceptual diagram illustrating a manner in which agent mode runs. In agent mode, the first mobile unit 11 performs a process designated by the user 100 (hereinafter referred to as "substitution process") on behalf of the user 100. On the other hand, the second mobile unit 40 moves together with the user 100 who is doing things away from the first mobile unit 11.

Examples of substitution processes that are performed by the first mobile unit 11 on behalf of the user 100 include, for example, a waiting process to wait in a queue on behalf of the user 100. More specifically, people who wish to use, for example, attractions, restaurants, or restrooms in a park sometimes have to wait in a queue until their turn comes up. In such a situation, the first mobile unit 11 may wait in a queue on behalf of the user 100. In another embodiment, the first mobile unit 11 may do shopping at a shop located in a remote place on behalf of the user 100.

In an embodiment in which the first mobile unit 11 waits in a queue on behalf of the user 100, the first mobile unit 11 identifies a person or a mobile unit that is present immediately before the first mobile unit 11 in the queue, and moves following this person or mobile unit. In an embodiment in which the first mobile unit 11 does shopping on behalf of the user 100, the first mobile unit 11 presents, to the user 100, a list of goods that can be purchased at a shop designated by the user 100. The user 100 selects, from among the goods in the presented list, one or more items of goods that they wish to purchase. After the user 100 selects a shop and goods, the first mobile unit 11 moves to that shop and purchases the selected goods.

After a substitution process proceeds to a defined rejoinable state, one of the first mobile unit 11 and the second mobile unit 40 moves toward the other so that the user 100 can rejoin with the first mobile unit 11. The term rejoinable state represents a state in which the first mobile unit 11 and the user 100 need to rejoin each other. For example, in a process to wait in a queue on behalf of the user 100, when the time required until the first mobile unit 11 reaches the top of the queue becomes a predetermined acceptable time or shorter, it can be determined that it is the rejoinable state. In a process to purchase goods on behalf of the user 100, when the purchase of goods is completed, it can be determined that it is the rejoinable state.

After it enters the rejoinable state, one of the first mobile unit 11 and the second mobile unit 40 moves toward the other. Which of the first mobile unit 11 and the second mobile unit 40 moves depends on the type of the substitution process that is performed on behalf of the user 100. For example, in a process to wait in a queue, as the first mobile unit 11 cannot leave the queue, after it enters the rejoinable state, the second mobile unit 40 and the user 100 who moves together with the second mobile unit 40 move toward the first mobile unit 11. On the other hand, in a process to purchase goods on behalf of the user 100, the first mobile unit 11 moves toward the second mobile unit 40 and the user 100.

Until it enters the rejoinable state, the user 100 may move freely together with the second mobile unit 40. However, the second mobile unit 40 may restrict the moving range of the user 100 to prevent the user 100 from moving too far away from the first mobile unit 11. Specifically, the first mobile unit 11 periodically confirms the position of the second mobile unit 40 to confirm whether or not the distance between the first mobile unit 11 and the second mobile unit 40 is within a defined agent distance. The agent distance is a separation distance that is allowed during agent mode. The agent distance is significantly larger than the companion distance or the following distance and is, for example, tens of meters to a few kilometers. The agent distance value may be a fixed value or may be a variable value that is changed as desired. For example, the agent distance may be changed in accordance with the time required until the first mobile unit 11 completes the substitution process. In any configuration, when the distance between the first mobile unit 11 and the second mobile unit 40 exceeds the agent distance, the second mobile unit 40 outputs an alarm notifying the user 100 of this fact to prevent the user 100 from moving too far away from the first mobile unit 11.

Figure 9:
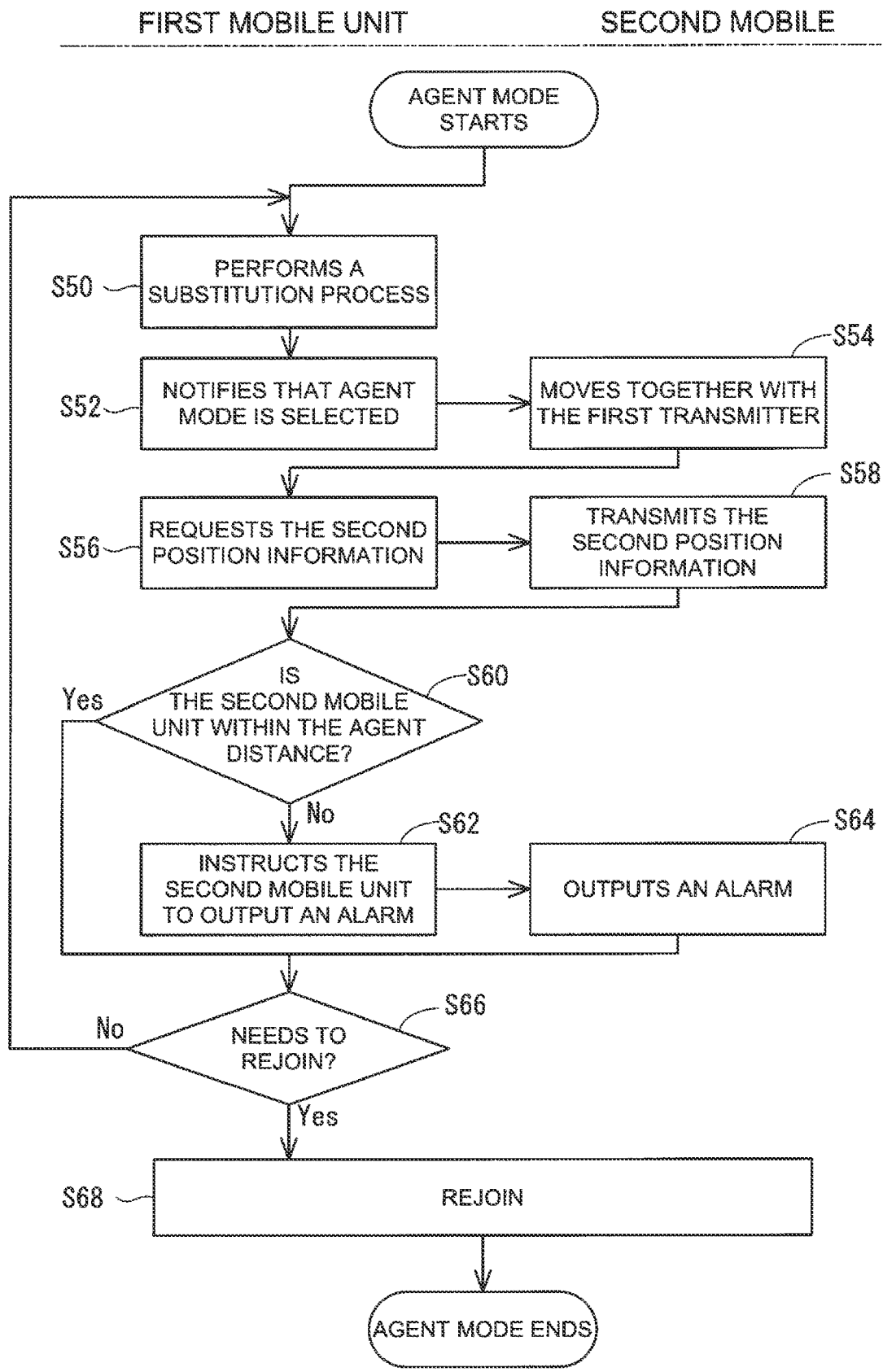
FIG. 9 is a flowchart illustrating a process flow in agent mode.

FIG. 9 is a flowchart illustrating a process flow in agent mode. When the user 100 provides an instruction to perform operation in agent mode, the first mobile unit 11 performs, as an agent, a substitution process designated by the user 100 (S50). The first mobile unit 11 notifies the second mobile unit 40 that agent mode is selected (S52). In response to this notice, the second mobile unit 40 moves together with the first transmitter 66*a* so that the distance from the first transmitter 66*a* that the first user 100*a* is carrying falls within the defined companion distance (S54).

The first mobile unit 11 requests the second mobile unit 40 to transmit the second position information, which is the position information of this second mobile unit 40 (S56). In response to this request, the second mobile unit 40 transmits, as the second position information, position information obtained by its own GPS receiver to the first mobile unit 11 (S58).

The first mobile unit 11 compares its own position with the position of the second mobile unit 40 (second position information) to determine whether or not the second mobile unit 40 is located within the predetermined agent distance (S60). As a result of the determination, when the second mobile unit 40 is further away than the agent distance (No in S60), the first mobile unit 11 instructs the second mobile unit 40 to output an alarm (S62). In response to this instruction, the second mobile unit 40 outputs an alarm indicating that the distance from the first mobile unit 11 is too long, to guide the user 100 to move closer to the first mobile unit 11 (S64). In other words, the second mobile unit 40 guides a moving range of the user 100 to prevent the distance to the first mobile unit 11 from exceeding the agent distance.

The first mobile unit 11 confirms whether or not it needs to rejoin the second mobile unit 40 (S66). For example, in a substitution process to wait in a queue on behalf of the user 100, the first mobile unit 11 determines that it needs to rejoin, when the time remaining until it reaches the top of the queue becomes a defined value or shorter. In a substitution process to do shopping on behalf of the user 100, the first mobile unit 11 determines that it needs to rejoin, when the purchase of the designated goods is completed.

As a result of the confirmation, when it is determined that it does not need to rejoin (No in S66), the process returns to step S50, and the processes of steps S50 through S64 are repeated. On the other hand, when it needs to rejoin (Yes in S66), the first mobile unit 11 and the second mobile unit 40 rejoin each other (S68). More specifically, one of the first mobile unit 11 and the second mobile unit 40 moves toward the other. When the second mobile unit 40 moving together with the user 100 rejoins the first mobile unit 11, agent mode becomes complete.

Configuring the high-functionality first mobile unit 11 in this manner to execute, as an agent, a process for the user 100 enables reduction of burdens on the user 100 and allows the user 100 to enjoy the park more. Configuring the second mobile unit 40 to move together with the user 100 makes it possible to prevent the first mobile unit 11 and the user 100 from moving too far away from each other and allows the user 100 to easily rejoin the first mobile unit 11 as needed.

Figure 10:
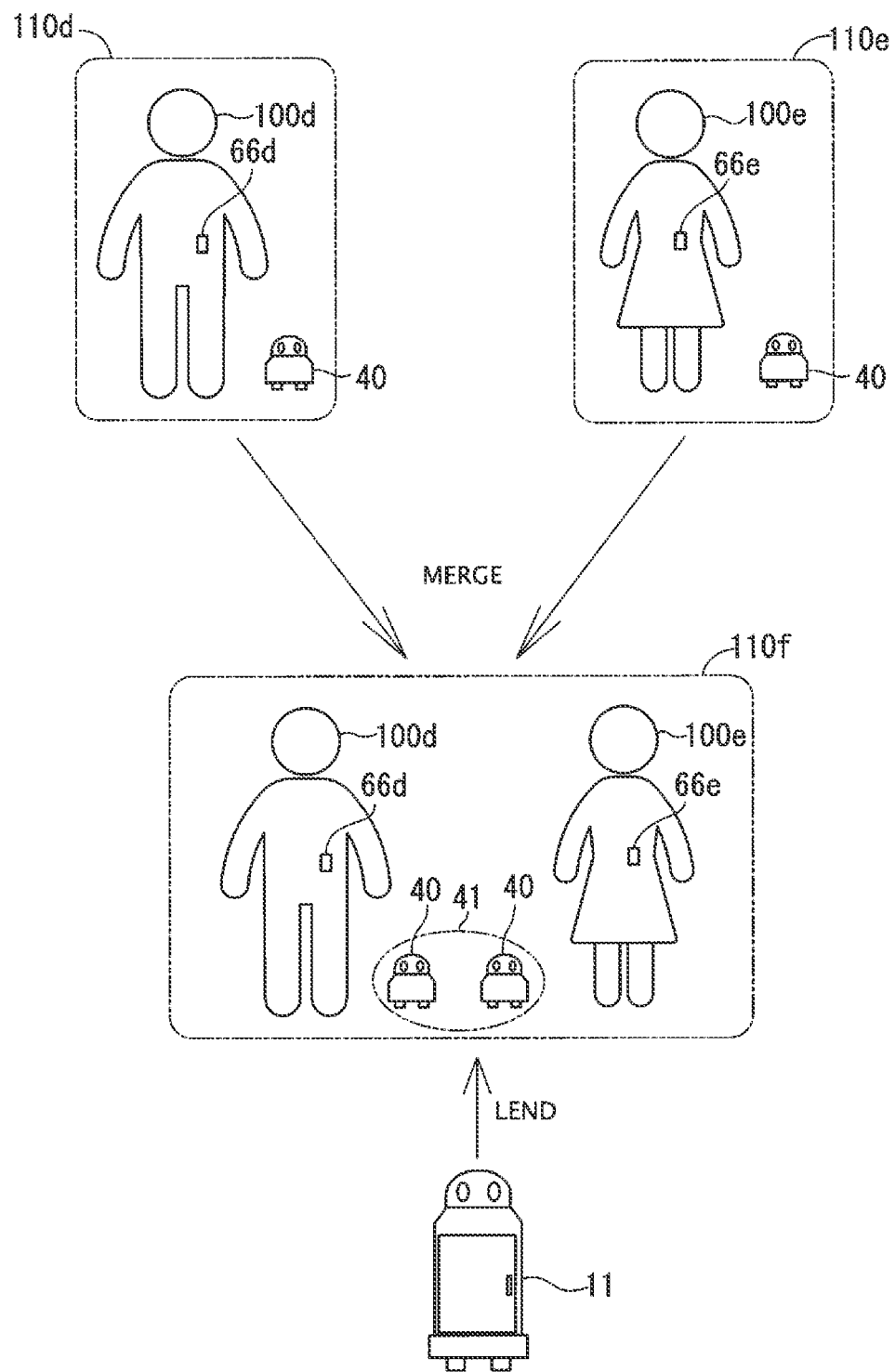
FIG. 10 is a conceptual diagram illustrating a manner in which solo mode runs.

Solo mode will next be described below. FIG. 10 is a conceptual diagram illustrating a manner in which solo mode runs. Solo mode is a mode of operation that is selected in the solo lend state. Specifically, as described above, in the present example, no first mobile unit 11 is lent to a small user group 110 whose number of members is less than the minimum number Ng (in the illustrated example, Ng=2), and only a single second mobile unit 40 is lent. In this case, the second mobile unit 40 is operated in solo mode.

During solo mode, the second mobile unit 40 is released from cooperation with the first mobile unit 11, and the second mobile unit 40 moves together with the user 100. More specifically, the second mobile unit 40 determines the position of the user 100 based on a signal from the transmitter 66 that the user 100 is carrying, and moves so that the distance from the user 100 falls within the companion distance.

During solo mode, as no first mobile unit 11 is lent to the user 100, the user 100 receives support only from the second mobile unit 40. However, since, as described above, the functionality of the second mobile unit 40 is lower than that of the first mobile unit 11, support provided by the second mobile unit 40 is limited to simple tasks such as route guidance.

During solo mode, when the user 100 provides a merge instruction, the second mobile unit 40 may create a temporary team 41 with another second mobile unit 40 operating in the solo lend state. More specifically, a user 100d who visits the park alone sometimes happens to make friends and partake in activities together with another user 100e who visits the park alone through, for example, an event in the park. In other words, a small user group 110d sometimes merges with another user group 110e to create a new user group 110f. When such a merge instruction indicating that a small user group 110 is to be merged with another small user group 110 is received from the user 100, the second mobile units 40 that are lent to the respective small user groups 110 establish one temporary team 41.

While many different methods of establishing a temporary team 41 are possible, for example, a plurality of users 100 who have become friendly with each other may input a merge instruction to the respective second mobile units 40 that are lent to themselves. The second mobile units 40 that have received this merge instruction exchange identification information with each other via wireless communication. Each of the second mobile units 40 stores, in a memory 46, the identification information obtained through this communication as identification information of the second mobile unit 40 that belongs to the same temporary team 41 as itself.

When a temporary team 41 is created, a second mobile unit 40 acts in cooperation with one or more other second mobile units 40 that belong to the same temporary team 41. For example, a second mobile unit 40 may act to prevent one or more other second mobile units 40 that belong to the same temporary team 41 from separating away. More specifically, a second mobile unit 40 periodically confirms the position of another second mobile unit 40 that belongs to the same temporary team 41, and, when the distance between them exceeds a predetermined companion distance, the other second mobile unit 40 may output an alarm informing the user 100 of this fact.

To increase the chance of users 100 getting to know each other and, in turn, to promote establishing a temporary team 41, a second mobile unit 40 that has yet to establish a temporary team 41 may guide its user 100. When an event is held in which, for example, users 100 who belong to different user groups 110 are supposed to clear one mission together, the second mobile units 40 may inform their users 100 of this event and guide them to the event venue. In another embodiment, a park may have a meeting spot where users 100 can gather when they wish to establish a temporary team, and the second mobile units 40 may inform their users 100 of this meeting spot and guide them there.

When a plurality of users 100 form a new user group 110 and establish a temporary team 41, the number of second mobile units 40 that constitute the temporary team 41 may as a result become greater than or equal to a defined lend criterion number N1. The lend criterion number N1 is not particularly limited and may be any number that satisfies N1≥2. In FIG. 10, N1=2. When the number of members in the temporary team 41 becomes greater than or equal to the lend criterion number N1, permission is given to lend the first mobile unit 11 to the new user group 110. More specifically, a second mobile unit 40 notifies its user 100 that permission has been given for them to borrow the first mobile unit 11 when the number of members in the temporary team 41 managed by the second mobile unit 40 becomes greater than or equal to the lend criterion number N1. If, in response to this notice, the user group 110 moves to a mobile unit rental spot in the park and submits an application, the first mobile unit 11 is lent to the user group 110. The first mobile unit 11 that has been lent enters into cooperation with the second mobile units 40 that constitute the temporary team 41. After that, the mobile units 11 and 40 are operable in one of standard mode, split mode, and agent mode as described above.

As is clear from the foregoing description, after the first mobile unit 11 is lent in response to establishing the temporary team 41, even a user 100 who visits the park alone, or a small group of users 100 who visit the park with one or a few others, can receive sophisticated support from the first mobile unit 11 and can enjoy the park more. As the first mobile unit 11 is lent in response to establishing the temporary team 41, this configuration motivates a user 100 who visits the park alone, or a small group of users 100 who visit the park with one or a few others, to attempt to actively interact with other users 100. As a result, interactions between users 100 are prone to happen, enabling the users 100 to have more enjoyable experiences.

Additionally, as is clear from the foregoing description, the mobile unit system according to the present example includes a high-functionality and large-size first mobile unit 11 and a low-functionality and small-size second mobile unit 40. This configuration can give the users 100 an impression that, as described above, the first mobile unit 11 and the second mobile unit 40 are "a parent and a child" and they are living things with emotions. This can increase emotional attachments that the users 100 develop towards the mobile units 11 and 40. As not all of the mobile units that are to be lent to the users 100 are configured to have high functionality, that is, as some of them have low functionality, the number of high-functionality mobile units required can be reduced, and the costs for the mobile units in the park overall can be reduced.

It should be noted that the above-described structures are given by way of example; that is, the mobile unit system includes the first mobile unit 11 configured to support activities of users 100 and the second mobile unit 40 configured to cooperate with the first mobile unit 11, wherein the second mobile unit 40 is smaller in size and has lower functionality than the first mobile unit 11, and any modifications to other structures may be made as desired. For example, the shape or size of the mobile unit 11 or 40 may be changed as desired. As such, for example, the first mobile unit 11 may have a form that is movable while carrying one or more users 100 thereon, such as an electric cart or an electric kick scooter. With this structure, the first mobile unit 11 can serve as transportation for the users 100. Although, in the foregoing description, the mobile unit 11 or 40 moves tracking a signal from the transmitter 66 that the user 100 is carrying, the mobile unit 11 or 40 may determine the position of the user 100 by performing wireless communication with an information terminal (such as a smartphone) that the user 100 is carrying, rather than using a signal from the transmitter 66. In another embodiment, the mobile unit 11 or 40 may determine the position of the user 100 by analyzing an image captured by a camera.

The invention claimed is:

1. A mobile unit system for use in a predetermined area, the mobile unit system to be lent to a user group consisting of at least one user, the mobile unit system comprising:
a first mobile unit comprising a first processor configured to support an activity of the at least one user; and
a second mobile unit comprising a second processor configured to cooperate with the first mobile unit,
wherein the second mobile unit is smaller in size and has lower functionality than the first mobile unit,
wherein when the user group is a small user group whose number of members is less than a defined minimum number, only the second mobile unit of the mobile unit system is lent to the small user group, and the second mobile unit is operated in solo mode,
wherein during solo mode, the second mobile unit moves together with the at least one user and, in response to a merge instruction from the at least one user indicating that the small user group is to be merged with another small user group, establishes a temporary team with a different second mobile unit that is lent to the another small user group, and
wherein when the number of different second mobile units that constitute the temporary team becomes greater than or equal to a defined lend criterion number, permission is given to lend the first mobile unit to a user group that is created after the small user groups are merged.

2. The mobile unit system according to claim 1,
wherein the first mobile unit has at least one of a baggage transportation function, a user transportation function, and a payment processing function, and
wherein the second mobile unit has none of the baggage transportation function, the user transportation function, and the payment processing function.

3. The mobile unit system according to claim 1, wherein the mobile unit system is operable in split mode when lent to a user group including a first user and a second user, and
wherein during split mode, the first mobile unit moves together with the first user, the second mobile unit moves together with the second user, and, in response to a rejoin instruction from either the first user or the second user, at least one of the first mobile unit and the second mobile unit moves toward the other to help the first user and the second user rejoin each other.

4. The mobile unit system according to claim 3,
wherein during split mode, the second mobile unit guides a moving range of the second user to prevent a distance to the first mobile unit from exceeding a predefined split distance.

5. The mobile unit system according to claim 1,
wherein the mobile unit system is operable in agent mode, and
wherein during agent mode, the first mobile unit executes a substitution process designated by the at least one user on behalf of the at least one user, the second mobile unit moves together with the at least one user, and, after the substitution process proceeds to a defined rejoinable state, at least one of the first mobile unit and the second mobile unit moves toward the other to help the at least one user rejoin the first mobile unit.

6. The mobile unit system according to claim 5,
wherein during agent mode, the second mobile unit guides a moving range of the at least one user to prevent a distance to the first mobile unit from exceeding a predefined agent distance.

7. The mobile unit system according to claim 1,
wherein the second mobile unit is a flying unit that is capable of flight, the flying unit having a camera that enables capturing of an image of the at least one user from above.

* * * * *